Figure 4:
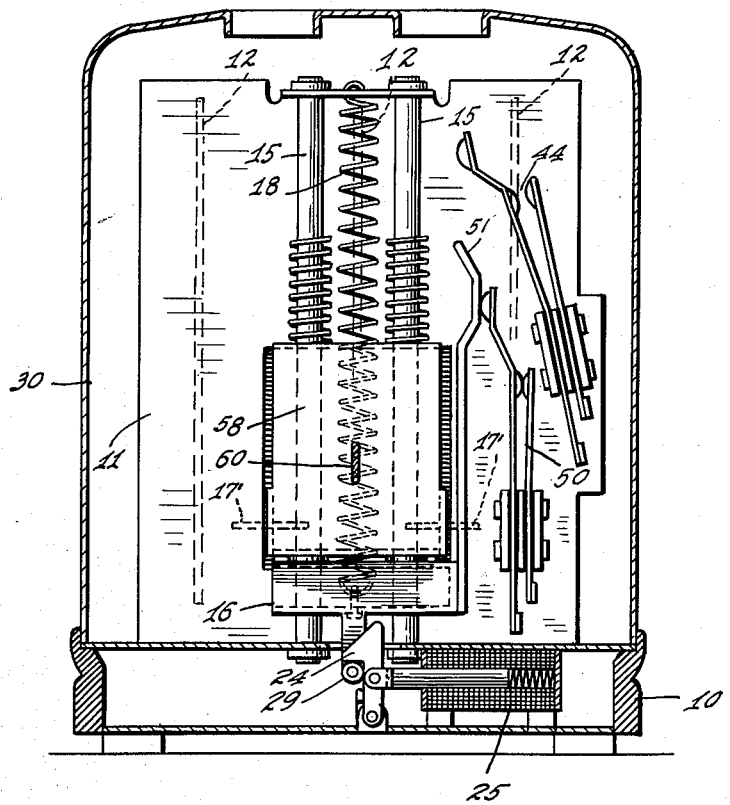

March 17, 1953 J. P. THEISEN 2,631,524
TOASTER AND ELECTRONIC TIMER
Filed Feb. 21, 1947 3 Sheets-Sheet 1
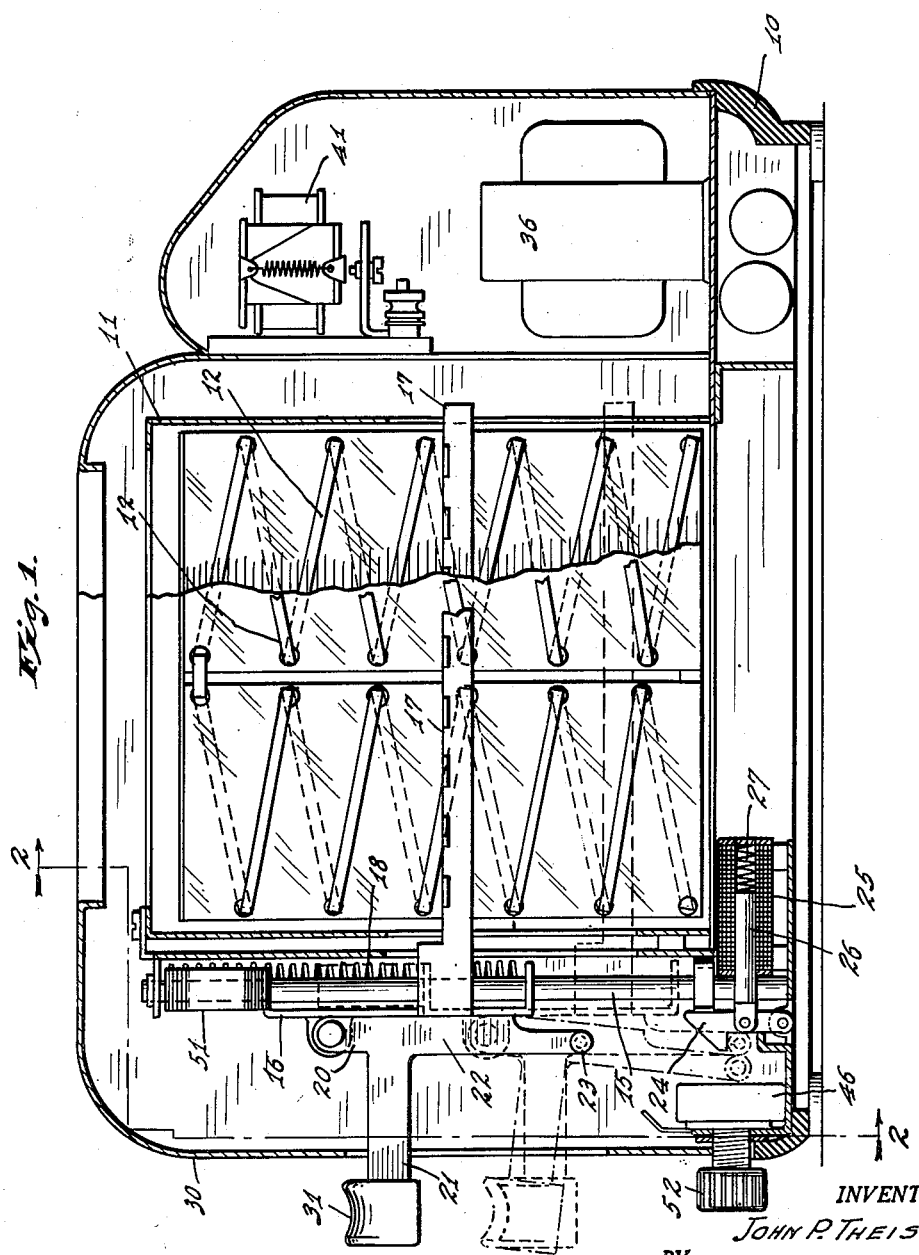
INVENTOR.
JOHN P. THEISEN,
BY
ATTORNEYS.

March 17, 1953     J. P. THEISEN     2,631,524
TOASTER AND ELECTRONIC TIMER
Filed Feb. 21, 1947     3 Sheets-Sheet 2
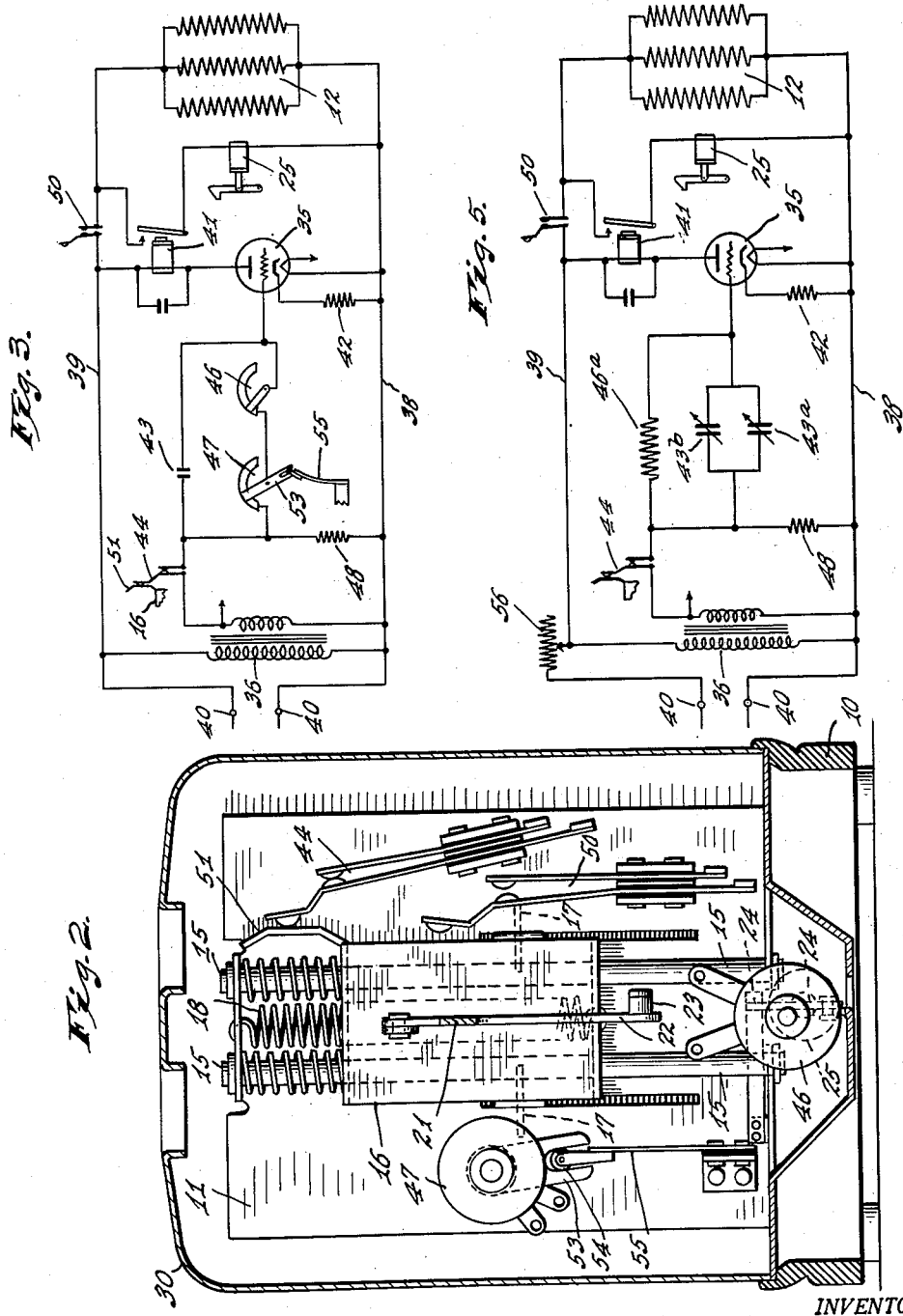
INVENTOR.
JOHN P. THEISEN,
BY
ATTORNEYS March 17, 1953   J. P. THEISEN   2,631,524
TOASTER AND ELECTRONIC TIMER
Filed Feb. 21, 1947   3 Sheets-Sheet 3

INVENTOR.
JOHN P. THEISEN,
BY
ATTORNEYS.

Patented Mar. 17, 1953

2,631,524

UNITED STATES PATENT OFFICE 2,631,524

TOASTER AND ELECTRONIC TIMER

John P. Theisen, Columbus, Ind., assignor to Arvin Industries, Inc., a corporation of Indiana Application February 21, 1947, Serial No. 730,160

3 Claims. (Cl. 99—333)

My invention relates to electric bread toasters or other cooking appliances, and more particularly to toasters provided with timing mechanism by which the toasting operation is terminated automatically upon the expiration of a predetermined time.

It is an object of this invention to provide a simple and effective timing mechanism which can readily be adjusted to vary the degree to which the bread is toasted and which will automatically vary the duration of the toasting interval in accordance with changes in the temperature of the toaster as a whole. Another object of my invention is to provide a toaster in which the toast will be ejected from the toasting compartment at the conclusion of the toasting operation, which toaster can be so operated to permit inspection of the toast prior to the completion of the toasting operation. A further object of the invention is to provide a toaster with means by which the crispness of the toast may be varied as desired.

In carrying out the invention, I desirably construct the toaster with upwardly opening toasting compartments associated with which are resistance heating elements and a slice-carrier, the latter operable to move the bread into the toasting compartments and to move the finished toast therefrom. Such carrier is biased upwardly and is arranged to be held depressed by a latch controlled by the timing mechanism so as to be released at the conclusion of a predetermined interval. The timing mechanism includes an electron-discharge device or vacuum tube controlled by the voltage across a condenser which is charged prior to the toasting operation and which discharges at a regulable rate during the toasting operation. The rate at which the condenser discharges, and hence the duration of the toasting interval, is controlled both manually, to vary the color of the toast, and automatically in accordance with the temperature of the toaster as a whole, to compensate for the effect of variations in toaster temperature upon the toasting rate. In one form of the invention, the latch which holds the slice-carrier depressed engages a carrier-operator which can be moved relatively to the carrier when desired to free it from the latch and permit the carrier to move upwardly for inspection of the toast. Control of toast-crispness is effected by means operative to vary the voltage across the heating elements and at the same time to vary in the opposite sense the duration of the toasting interval.

The accompanying drawings illustrate a preferred embodiment of my invention: Fig. 1 is a longitudinal section through a toaster; Fig. 2 is a transverse section on the line 2—2 of Fig. 1; Fig. 3 is a wiring diagram; Fig. 4 is a view similar to Fig. 2 illustrating a modified construction; and Fig. 5 is a fragmental wiring diagram illustrating a further modification.

The toaster illustrated in the drawings comprises a frame including a base 10 and a housing 11, the latter serving to enclose resistance heating elements 12. As shown, there are three of the heating elements 12, such elements being spaced from each other to define a pair of upwardly opening toasting compartments. Mounted on the front side of the housing 11 are a pair of vertical guide rods 15 which slidably support a carriage 16 upon which are mounted slice carriers 17 extending into the toasting compartments. A tension spring 18 acting between the housing 11 and carriage 16 biases the latter upwardly.

Pivotally mounted on the front face of the carriage 16 is a bell crank 20 having a horizontal carrier-operating arm 21 and a vertical arm 22 which extends downwardly along the front face of the carriage 16 and bears at its lower end a detent roller 23. Supported on the base 10 is a latch 24 which is biased toward the path of the detent roller 23 and which can be retracted by a solenoid 25. As shown, the latch 24 is operatively connected to the core 26 of the solenoid 25, and a spring 27 acting against the solenoid-core urges the latch 24 forwardly.

The horizontal arm 21 of the bell crank 20 extends through a vertical slot in the front face of a cover 30 and may there be provided with a knob 31. To depress the slice-carriers 17, downward pressure is applied to the knob 31. Such pressure tends to rotate the bell crank 20 in a counter-clockwise direction (Fig. 1), but such rotation is prevented by engagement of the vertical arm 22 with the front face of the carriage 16; and the carriage is therefore forced downwardly until the detent 23 strikes the inclined upper surface of the latch 24, deflects the latch rearwardly, and engages beneath it. With the latch 24 advanced, the carrier can be raised at any time merely by lifting the knob 31 upwardly to swing the bell crank 20 in a clockwise direction and move the detent roller 23 from engagement with the latch.

The illustrated automatic timing mechanism for effecting release of the latch 24 upon completion of the toasting interval includes (Fig. 3) a three-element electron discharge device or triode 35 and a transformer 36, desirably a step-down transformer, the primary of which is connected to conductors 38 and 39 extending to input terminals 40 adapted for connection to any suitable source of alternating current. The solenoid 25 is connected through the contacts of a relay 41 between the conductors 38 and 39 so as to be energized whenever the relay 41 is closed. The relay 41 is connected between the plate or anode of the triode 35 and the conductor 39 while the cathode of the triode is connected to the conductor 38, desirably through a resistance 42. The grid or control element of the triode 35 is connected through a timing condenser 43 and a switch 44 with one terminal of the secondary of the transformer 36 and the other terminal of such transformer-secondary is connected to the conductor 38.

Connected in parallel with the timing condenser 43 and in series with each other are a pair of variable resistors 46 and 47. A fixed resistor 48 is connected in series with the variable resistors 46 and 47 between the conductor 38 and the grid of the triode 35. A switch 50 interposed in the conductor 39 controls the supply of current to the heating elements 12 and also to the circuit including the solenoid 25 and the contacts of the relay 41.

The switches 44 and 50 are arranged to be operated by the carriage 16, the former switch being closed when the carriage is elevated and open when the carriage is depressed, and the switch 50 being open when the carrier is elevated and closed when the carrier is depressed. To this end, each of the switches 44 and 50 conveniently comprises a pair of contact-bearing arms one of which projects into the path of a cam 51 mounted on the carriage 16.

The variable resistor 46 is adapted for manual control to vary the color of the toast produced in the manner hereinafter set forth, and may be mounted on the base 10 and provided with an operating knob 52 accessible for manual adjustment. The other variable resistor, 47, is arranged to be automatically adjusted in accordance with the temperature of the toaster as a whole. To this end, it may be mounted on the front face of the housing 11 and provided with a bifurcated adjusting element 53 which receives a roller 54 carried by the free end of a bi-metallic strip 55 mounted on the front wall of the housing 11. The arrangement is such that upon an increase in toaster temperature the resultant flexing of the bi-metallic strip 55 will operate the control element 53 to reduce the resistance of the resistor 47.

When it is desired to operate the toaster, the input terminals 40 are connected to a suitable source of alternating current. With the carriage 16 and slice-carriers 17 elevated, the switch 44 is closed and the switch 50 is open. As a result, the output voltage of the transformer 36 will be impressed through the condenser 43 across the cathode and grid of the triode 35. Such two triode-elements act as a rectifier with the result that a substantial negative charge is imparted to that plate of the condenser 43 which is connected with the triode-grid. During the brief interval required to charge the condenser to the output voltage of the transformer, no substantial current will flow through the winding of the relay 41, since the phase-reversal effected by the transformer 36 renders the grid of the triode 35 negative whenever the plate of the triode is positive and the plate negative whenever the grid is positive.

When it is desired to toast bread, two slices are inserted in the toasting compartments and the carriage 16 is depressed by operation of the knob 31. In the downward movement of the carriage 16, the switch 44 is opened and the switch 50 is closed. As a result of the latter operation, current is supplied to the toasting elements 12 and the circuit through the solenoid 25 and the contact of the relay 41 is prepared for closing upon energization of the relay 41.

Opening of the switch 44 prevents the supply of further charge to the condenser 43, and such condenser begins to discharge through the series-connected resistors 46 and 47. As the condenser discharges, the negative bias on the grid of the triode 35 decreases and eventually reaches a point where the triode will become conductive to cause energization of the relay 41. When this occurs, the circuit through the solenoid 25 will be completed, and the resultant energization of the solenoid 25 will retract the latch 24 and permit the carriage 16 and carrier 17 to be moved upwardly by the tension spring 18, thus terminating the toasting operation. Upon upward movement of the carriage 16, the switch 50 will be opened to de-energize the solenoid 25 and interrupt the supply of current to the heating elements 12, while closing of the switch 44 will again cause the condenser 43 to become charged.

From the above description of the operation, it will be apparent that the duration of the toasting interval will depend upon the time required for the condenser 43 to discharge to the point at which the negative bias of the grid of the triode 35 permits passage of sufficient plate current to energize the relay 41, and it will further be obvious that the time required for the condenser 43 to discharge to such point will depend upon the aggregate resistance of the resistors 46 and 47. By adjusting the resistor 46 to increase its resistance, the duration of the toasting interval will be lengthened and darker toast obtained. As the toaster increases in temperature with successive toasting operations, the interval required to produce toast of a constant color decreases; and if the toasting interval were of constant duration, the toast would become progressively darker as the toaster-temperature increased. However, in the device described an increase in toaster-temperature reduces the resistance of the resistor 47, thus reducing the duration of the toasting interval as the toaster-temperature increases.

As pointed out above, for any given condenser 43 the time required to reduce the potential of the grid of triode 35 to the point at which plate current becomes sufficient to energize the relay 41 will depend upon the aggregate resistance of the resistors 46 and 47. More broadly, the time required to discharge the condenser to the point at which the relay 41 closes depends upon the ratio of the capacity of the condenser to the resistance through which it discharges. Accordingly, duration of the toasting interval can be controlled as well by varying condenser capacity as by varying the resistance through which the condenser discharges. I have indicated such an arrangement in Fig. 5, which shows the variable resistors 46 and 47 as replaced by a single fixed resistor 46a and the single condenser 43 is replaced by condensers 43a and 43b of variable capacity. An increase in the aggregate capacity of the condensers 43a and 43b will increase the duration of the toasting operation, while a decrease in condenser capacity will decrease the duration of the toasting operation. It is of course contemplated that one of the condensers 43a and 43b will be controlled in accordance with toaster-temperature, as was the resistor 47, to correct for the effect of toaster-temperature in modifying duration of the toasting interval, while the other, like the resistor 46, will be under manual control to vary the color of the toast.

The circuit illustrated in Fig. 5 further differs from that of Fig. 3 in the provision of a rheostat 56 which can be adjusted to vary simultaneously the potential impressed upon the primary 36, the potential impressed on the anode of the triode 35, and the potential impressed on the heating elements 12. I have found that the inclusion of the rheostat 56 makes possible a control of toast-crispness. Increasing the resistance of the resistor 56 decreases the potential impressed on the heating elements and consequently reduces the rate of heat-emission therefrom. As is well known, decrease in the rate of heat emission will cause an increase in the crispness produced. To produce toast of a desired color at the decreased rate of heat-emission requires that the toasting interval be lengthened, and this result is obtained in the circuit shown in Fig. 5 primarily as a result of the decreased potential imposed on the anode of the triode 35. An increase in the resistance of the resistor 56 decreases the potential impressed on the grid circuit by the secondary of the transformer 36, and that potential-reduction reduces the charge impressed on the timing capacity. Such reduction in charge tends of itself to reduce the toasting interval; but that effect is more than compensated for by the accompanying reduction in the potential impressed on the anode of the triode 35. The rheostat 56 can be employed irrespective of the nature of the means employed to vary the duration of the toasting operation.

In the modified toaster construction shown in Fig. 4, the carriage 16 is shortened vertically and a supplementary carriage 58 is slidably mounted on the guide rods 15 above it. As in the construction previously described, the spring 18 acts between the housing 11 and the carriage 16 to urge the latter upwardly. In the construction of Fig. 4, however, the carriage 16 is provided with a fixed detent 29 positioned to be engaged by the latch 24 to hold the carriage 16 depressed against the upward effort exerted on it by the spring 18. The slice-carriers 17', instead of being mounted on the carriage 16, are mounted on the supplementary carriage 58, which is freely separable vertically from the carriage 16; but the switch-operating cam 51 is retained in the main carriage 16. For the purpose of moving the carriage 58 vertically, it is provided with an operating arm 60 which projects outwardly to be accessible for manual operation.

When the toaster of Fig. 4 is in non-toasting condition, the carriage 16 is elevated by the spring 18; and as the supplementary carriage 58 rests on the carriage 16 it is likewise elevated. To institute a toasting operation, the supplementary carriage 58 is moved downwardly by manual effort applied to the arm 60. The carriage 16, being disposed beneath the supplementary carriage, is forced downwardly with it until the abutment 59 is engaged by the latch 24. While the latch remains in engagement with the abutment 59 to retain the carriage 16 depressed until the solenoid 25 is energized, the supplementary carriage 58 together with the slice-carrier 17 and the bread resting thereon can at any time be raised to inspect the progress of the toasting operation. When the latch 24 is released at the conclusion of the toasting interval, the spring 18 raises the carriage 16, and the supplementary carriage 58, together with the carriers 17', is forced upwardly to raise the toast.

While both the construction shown in Figs. 1 and 2 and that shown in Fig. 4 permit inspection of the toast prior to termination of the toasting interval and release of the latch 24, the two constructions function somewhat differently. In the arrangement of Figs. 1 and 2, release of the latch 24 and subsequent upward movement of the carriage 16 opens the switch 50 and closes the switch 44, thus causing complete recharging of the timing condenser. Upon a subsequent depression of the carriage a new toasting interval is initiated, and the latch 24 will remain engaged until that new interval terminates. In the construction of Fig. 4, on the other hand, elevation of the supplementary carriage alone is without effect on the switches, and the initial toasting interval proceeds to its normal conclusion.

I claim as my invention:

1. In an electric bread-toaster, a toasting chamber, electrical resistance heating elements disposed on opposite sides of said chamber for toasting a bread-slice therein, an electron-discharge device having an anode, a cathode, and a control element, connections establishing a plate circuit including said cathode and anode and a grid circuit including said cathode and control element, current-responsive means in said plate circuit energizable to terminate a toasting operation, a condenser in said grid circuit, a condenser-discharge circuit including a resistance, a current source for supplying current to said heating elements and for maintaining a potential difference between said cathode and anode, a second current-source connectible to said condenser to impart thereto a charge impressing on said control element a negative potential proportional to the potential of said second current-source, means including a variable resistance for varying the respective potentials of said two current sources simultaneously and in the same sense, means for initiating a toasting operation, a switch in said grid circuit operable jointly with said initiating means for disconnecting the control element and condenser from the second current-source to permit the condenser to discharge through said condenser-discharge circuit.

2. The invention set forth in claim 1 with the addition of means for varying the ratio between said resistance and the capacity of said condenser, said means being responsive to the temperature of the toaster.

3. The invention set forth in claim 1 with the addition of means for varying the ratio between said resistance and the capacity of said condenser.

JOHN P. THEISEN.

REFERENCES CITED

The following references are of record in the file of this patent:

UNITED STATES PATENTS

| Number | Name | Date |
|---|---|---|
| 2,024,019 | Wright | Dec. 10, 1935 |
| 2,141,867 | Ireland | Dec. 27, 1938 |
| 2,171,347 | Schneider | Aug. 29, 1939 |
| 2,182,124 | Guerra | Dec. 5, 1939 |
| 2,274,992 | Nelsen | Mar. 3, 1942 |
| 2,306,237 | Wolfner | Dec. 22, 1942 |
| 2,336,696 | McCullough | Dec. 14, 1943 |
| 2,346,079 | Newton | Apr. 4, 1944 |
| 2,361,078 | Anderson | Oct. 24, 1944 |
| 2,364,998 | Palmer et al. | Dec. 12, 1944 |
| 2,389,927 | Parr | Nov. 27, 1945 |
| 2,414,081 | Barclay | Jan. 14, 1947 |
| 2,415,963 | Olving | Feb. 18, 1947 |
| 2,451,508 | Olving | Oct. 19, 1948 |
| 2,560,386 | Gomersall | July 10, 1951 |